Aug. 25, 1959     L. J. KELLY     2,901,414
HYDROCARBON CONVERSION SYSTEM
Filed June 15, 1954
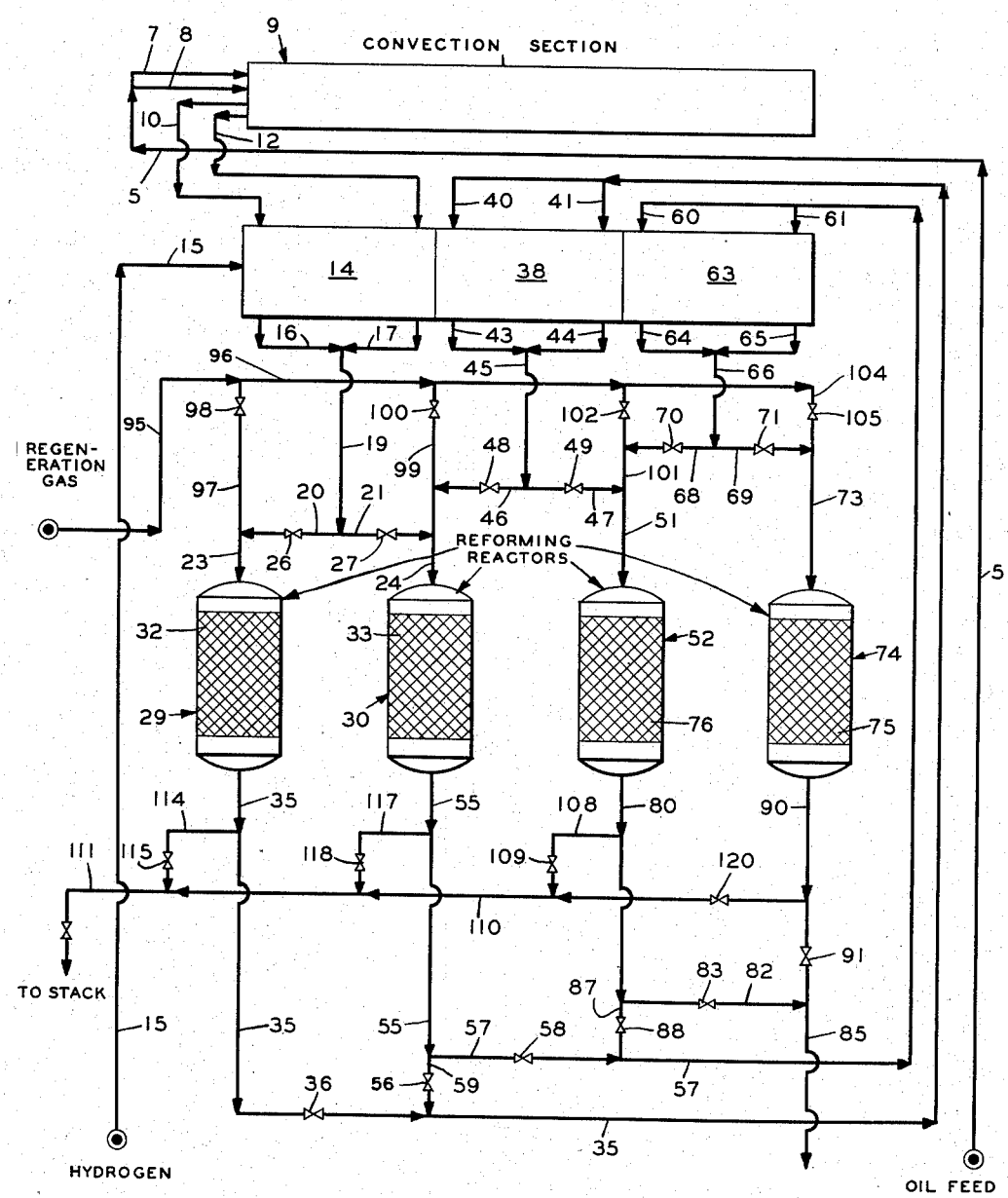
INVENTOR
LOUIS J. KELLY
BY G.H. Palmer
T.C. Virgil
ATTORNEYS

United States Patent Office

2,901,414
Patented Aug. 25, 1959

2,901,414

HYDROCARBON CONVERSION SYSTEM

Louis J. Kelly, Tenafly, N.J., assignor to The M. W. Kellogg Company, Jersey City, N.J., a corporation of Delaware Application June 15, 1954, Serial No. 436,789

14 Claims. (Cl. 208—65)

This application relates to an improved system for operating a multi-contacting zone system in which a periodic treatment of one of the contacting zones is necessary for maintenance of the operation and, more particularly, it pertains to method and means for operating a multi-reactor system which is employed in reforming a light hydrocarbon oil.

At present, there is considerable development in connection with fixed bed platinum system for reforming a light hydrocarbon oil to produce a high octane quality gasoline product. The catalytic material is of a subdivided nature and in view of the nature of the reforming reactions, it is customary to pass the hydrocarbon reactant in sequence through a reaction series of at least two contacting zones or reactors in order to obtain the desired product. By reason of the low carbon producing tendency of platinum catalysts, the amount of time which is necessary for the regeneration of the catalyst is relatively low in comparison with the reaction time. However, in order to maintain a continuous system, it is necessary to employ an additional reactor which is held in reserve for utilization in the reaction series when one of the reactors is being regenerated. By means of this invention, novel method and means of changing reactors to provide for a continuous operation are proposed.

An object of this invention is to provide improved method and means for operating a multi-contacting zone system in which at least two contacting zones involve the passage of a gaseous or vaporous material in sequence therethrough.

Another object of this invention is to provide a system containing multiple contacting zones whereby the flow of gaseous or vaporous material being treated is not interrupted when it is desired to remove one of the contacting zones for service and to substitute another in place thereof.

Still another object of this invention is to provide a fixed bed platinum hydroforming system involving multiple reactors through which the hydrocarbon reactant flows in sequence and the flow of hydrocarbon reactant is not interrupted when it is necessary to regenerate one of the vessels comprising the reaction series.

Other objects and advantages of this invention will become apparent from the following description and explanation thereof.

By means of this invention, method and means of practicing the invention are provided which comprise passing a chemical material in vaporous or gasiform state in sequence through a series of at least two contacting zones containing subdivided solid material and thereby obtaining the treatment desired along with contamination of the solid material with a combustible material, an additional contacting zone containing solid material is maintained for service in the series when one of the zones is removed from operation to treat the same for removal of the combustible material through combustion with an oxygen containing gas, the contacting zones are situated to provide parallel flow of chemical material to pairs thereof and there is at least two such pairs and at least one of the zones can form two pairs with two other zones to provide two separate parallel flow arrangements, the contacting zones are shifted in position by placing at least the zone originally not in service in parallel flow arrangement with a zone forming a pair therewith, and the parallel flow of material through the zones is discontinued by effecting a shift in the position of the zones relative to the original serial flow such that the zone originally not in service is part of the serial flow in the series and the zone to be treated by means of an oxygen containing gas is out of service.

The present invention is applicable to any system in which multi-contactors or reactors are employed in the passage of a gaseous or vaporous material in sequence therethrough and it is required periodically to remove one of the contactors or reactors from service without interrupting the flow of material for treatment. In this connection, the subdivided material can be any solid having catalytic properties or one of non-catalytic properties such as, for example, desiccants, etc. By virtue of the treatment, it is necessary to discontinue from use one of the contactors in the series and, therefore, an auxiliary or reserve contactor is provided to be placed in series as a substitute. For the purpose intended, the multi-contactor or reactor system involves having at least two reactors or contactors in use in sequential passage of chemical material therethrough and another contactor is held in reserve for replacement in the series when needed. In general, the method of the present invention can be used in hydrocarbon conversion systems, for example, desulfurization, catalytic cracking, hydrogenation, dehydrogenation, isomerization, aromatization, etc. In a hydrocarbon conversion process, the hydrocarbon reactant is contacted with a suitable hydrocarbon conversion catalyst and as a result, the catalyst becomes contaminated with a carbonaceous material and it is necessary for restoration of catalyst activity to remove the same by combustion with an oxygen containing gas.

This invention is particularly applicable to a system in which the time of contact between the chemical material and the subdivided solid material is significantly longer than the time required to treat the solid material for removal of the combustible deposit. Such systems, in general, involve using the auxiliary or reserve reactor for about 20 to about 70% of the time for a given period of operation. An example of this type of operation is hydroforming by means of a platinum catalyst. In the hydroforming reaction, the catalyst contains about 0.05 to about 10% by weight of platinum on a carrier material, e.g., alumina, silica, zinc spinel, kieselguhr, pumice, etc. The light hydrocarbon oil to be reformed is contacted with the catalytic material at a temperature in the range of about 825° to about 1050° F., more usually, about 850° to about 975° F., and at a pressure in the range of about 25 to about 1000 p.s.i.g., more usually, about 100 to about 750 p.s.i.g. The quantity of oil processed relative to the amount of catalyst which is present in the reactors is given as the weight space velocity, $W_o/hr./W_c$, and for the purpose of this invention, it is about 0.5 to about 15, more usually, about 1 to about 10. The hydroforming reaction is conducted in the presence of added hydrogen and the hydrogen is usually derived from the hydroforming reaction. The hydrogen is added in an amount of about 500 to about 15,000 standard cubic feet, 60° F. and 760 mm. Hg, per barrel of oil feed, 1 barrel equals 42 gallons, abbreviated as s.c.f.b. More usually, the hydrogen rate is about 1500 to about 7500 s.c.f.b. In connection with the catalyst, it should be noted that the subdivided solid material can be present as lumps, pellets, pills, etc., and the size may vary appreciably just so long as the hydrocarbon reactant is able to pass through the bed of the material.

The feed material for the hydroforming reaction is a light hydrocarbon oil, e.g., gasoline, naphtha and/or kerosene. The feed material can be a straight run fraction, a thermally or catalytically cracked stock or mixtures of the two. This feed material has an initial boiling point of about 75° to about 275° F. and an end point of about 320° to about 480° F. The quantity of paraffins which are present in the feed material can be measured on the basis of the Watson characterization factor and this factor can be from about 11.0 to about 12.2. As a result of the hydroforming reaction, the catalyst becomes contaminated with carbonaceous material, in general, the carbon content is about 1 to about 8% by weight of the total material. The regeneration of the catalyst is effected at a temperature of about 500° to about 1100° F., the pressure varying in the range specified hereinabove in connection with the reaction, and the regeneration gas is one which contains oxygen and it can be, for example, air or diluted air containing about 0.2 to about 10% by volume of oxygen. In the regeneration of the catalyst, it is preferred to employ a relatively low temperature in the range of about 500° to about 900° F., in order that the catalyst is contacted with water vapor, which is produced by the combustion of carbon, at low temperatures.

In order to provide a better understanding of this invention, reference will be had to a specific example in the accompanying drawing which forms a part of this specification, however, it should be understood that the general applicability of this invention to other kinds of systems is also intended.

In the drawing, a naphtha fraction having an initial boiling point of 207° F., an end point of 273° F. and an API gravity of 53.5° is supplied by means of line 5 at the rate of about 2000 barrels per day. The oil feed is divided into equal portions which pass through lines 7 and 8 prior to entering a convection section 9, shown schematically. The oil vapors are discharged from the convection section by means of lines 11 and 12 and then they are passed to a radiant section 14, shown schematically, and in radiant section 14, the oil vapors are combined with a recycle gas containing hydrogen in the amount of about 90% by volume and which is supplied to radiant section 14 by means of line 15. The combined oil vapors and hydrogen are discharged from radiant section 14 by means of lines 16 and 17 and this combined stream exists at a temperature of 975° F. The hydrogen supplied to the radiant section 14 constitutes about 5000 s.c.f.b. The combined stream of oil vapor and hydrogen is passed through line 19, and thence, it is processed in a manner to be described hereinafter.

The system by which the process is operated as well as the method by which the reaction vessels are shifted to effect regeneration of any one of the vessels without interrupting the flow of the reactant, constitute the novel features of this invention. In this connection, it should be noted that line 19 is connected to two separate lines 20 and 21 and each of these lines are in turn connected to reactor inlets 23 and 24, respectively. Lines 20 and 21 contain valves 26 and 27, respectively. Reactor inlets 23 and 24 are connected to reactors 29 and 30, respectively, and these reactors contain catalyst beds 32 and 33, respectively. The catalyst employed in this example is 0.6% by weight of platinum supported on alumina and the platinum is in the form of pellets having a 1/16 inch diameter and 1/8 inch long. It can be seen from the piping arrangement that reactors 29 and 30 constitute a pair such that parallel flow of reactant material to each of these reactors is possible by virtue of lines 20 and 21. In this particular example, valve 26 is in an open position and valve 27 is closed, consequently, the reactant material passes through reactor 29.

As a result of the highly endothermic reactions taking place in reactor 29, the reaction product is discharged from the bottom thereof by means of line 35 at a temperature of about 825° F. Line 35 contains a valve 36 and this line is connected to another radiantly heated furnace 38 by first dividing into lines 40 and 41. By means of furnace 38, the reactant material is reheated to a temperature of 975° F., and it is discharged therefrom by means of lines 43 and 44, and thence it is combined as a single stream in line 45. The piping is arranged such that the reactant flowing through line 45 can be divided to pass through lines 46 and 47. Lines 46 and 47 contain valves 48 and 49, respectively. Line 47 is connected to reactor inlet 51 of a third reactor 52. Here again, it can be seen that the reactant material flowing through line 45 can pass simultaneously through reactors 30 and 52, consequently, these reactors form a pair for parallel flow arrangement. In the present example, valve 49 is closed and valve 48 is open, consequently, the hydrocarbon reactant passes through line 46 and thence through reactor 30. As a result of the endothermic hydroforming reactions in reactor 30, the reaction product is discharged from the bottom thereof by means of line 55 at a temperature of 900° F. Discharge line 55 branches into line 57 and the hydrocarbon reactant is then passed to line 57 which contains a valve 58 in an open position.

In another flow arrangement, it may be necessary for the hydrocarbon reactant being discharged from reactor 30 to pass first through line 55 and then through another line 59 containing a valve 56. Line 59 is connected with line 35 which has been previously described as being the outlet for the product of reactor 29. In the specific operation being described, valve 56 is kept in a closed position. The reactant material is first divided into lines 60 and 61 and then it is passed to a radiantly heated furnace 63 wherein the temperature is raised to 975° F. The heated reactant is discharged from furnace 63 by means of lines 64 and 65 and these streams are combined to pass through line 66. The reactant material in line 66 can be further divided to pass through lines 68 and 69 which contain valves 70 and 71, respectively. Line 69 is connected to reactor inlet 73 and reactor 74 which contains a catalyst bed 75. Reactor 52 contains a catalyst bed 76 and the sizes of the catalyst beds in reactors 29, 30, 52 and 74 are the same. By virtue of the piping arrangement for reactors 52 and 74, it can be seen that these reactors form a pair for parallel flow arrangement. Still further, it should be noted that reactors 30 and 52 are arranged to provide two separate parallel flows. In this connection, reactor 30 forms a pair with either reactor 29 or reactor 52, and on the other hand, reactor 52 forms a pair either with reactor 30 or reactor 74. The quantity of total catalyst which is present in reactors 29, 30 and 52 provide a weight space velocity of about 2.5.

As a result of the conditions existing in reactor 52, reaction product is discharged from the bottom thereof by means of line 80 at a temperature of 950° F. The total pressure in the system is maintained at about 200 p.s.i.g., however, this pressure varies from reactor to reactor by virtue of the pressure drop which is encountered by passing through the catalyst beds in the respective zones. The reaction product which is discharged from reactor 52 flows through line 80, and thence it passes into line 82 which contains a valve 83 in an open position. The reaction product flowing in line 82 is then passed to a product line 85 from which the material is passed to a product recovery system, not shown. In this specific operation, the reaction product cannot flow from line 80 to line 87 by reason that valve 88 contained therein is in a closed position. Line 80 is connected to previously mentioned line 57 by means of line 87. When reactor 74 is employed for the reaction cycle, the reaction product is discharged from the bottom thereof by means of line 90 and the material is passed through a valve prior to passing to the product recovery system, not shown.

As previously indicated in the specific example described above, reactors 29, 30 and 52 constitute the reaction series. The hydrocarbon reactant is passed through the three reactors in sequence. In the event that one of the reactors should require regeneration and, in this specific example assuming that all of the reactors were placed on stream with catalysts of the same activity, reactor 52 is most likely the one to require regeneration first. In order to replace reactor 52 by means of reactor 74 without interrupting the flow of hydrocarbon reactant, the first step in the shift is effected by opening valve 71 in line 69 and valve 91 in line 90. By opening these valves, the hydrocarbon reactant is passed by parallel flow arrangement through reactors 52 and 74. Thereafter, valve 70 in line 68 and valve 83 in line 82 are closed. Consequently, reactor 52 is ready for regeneration and reactor 74 has taken its place in the series.

The regeneration of catalyst bed 76 in reactor 52 is effected by passing regeneration gas from supply line 95 to the main header 96. The main header 96 has four lines connected thereto which lead to the reactors under discussion. In this respect, header 96 is connected to reactor 29 by means of line 97 containing valve 98, reactor 30 is connected to header 96 by means of line 99 containing valve 100; reactor 52 is connected to header 96 by means of line 101 containing valve 102; and reactor 74 is connected to header 96 by means of line 104 containing valve 105. In the specific example being described, regeneration gas flows from header 96 through line 101, valve 102 and line 51 before entering the top of reactor 52. While this is being done, valves 98, 100 and 105 are in a closed position. The flue gas resulting from the combustion of carbonaceous material in reactor 52 is discharged from the bottom thereof through line 80, and thence it flows through line 108 in which there is contained a valve 109. Valve 109 is in an open position, consequently, the flue gas flows into a common header 110, which in turn, is connected to a vent line 111 leading to a stack, not shown. On the other hand, when reactor 29 is being regenerated, the flue gas is discharged first through line 35 and then through line 114 in which there is installed valve 115 and the line in turn is connected to main header 110. Similarly, reactor 30 contains the bottom line 55 connected to a line 117 which contains valve 118 and line 117 is in turn connected to main header 110. With respect to reactor 74, the bottom line 90 of the reactor is connected directly to main header 110 and in this connection, header 110 contains valve 120. The regeneration of the catalyst is effected at an average temperature of about 800° F. and at a pressure of about 25 p.s.i.g. The regeneration gas comprises 2% by volume of oxygen and it is formed by diluting air with flue gas which is produced in the operation.

After reactor 52 has been regenerated, it is held in reserve until such time as it is necessary to regenerate another reactor. In this connection, on the basis of the conditions employed in the system, reactor 30 may require regeneration next among the several vessels constituting the reaction series. When it is necessary to regenerate reactor 30, it is replaced by reactor 52 by first opening valve 49 in line 47 and valve 88 in line 87. This change in the position of the valves causes the reactant to flow in a parallel manner simultaneously through reactors 30 and 52. After this has been done, valve 48 in line 46 and valve 58 in line 57 are closed. Consequently, reactor 30 is removed from the system and reactor 52 has taken its place in the reaction series. The same procedure of shifting the reactor is employed when it is necessary to regenerate reactor 29 and substituting for it reactor 30. It does happen that one of the reactors, due to faulty catalyst or extreme reaction conditions, may require regeneration in advance of those reactors indicated hereinabove. For example, assuming reactor 74 is the reserve reactor and that, due to unusual conditions, reactor 29 requires regeneration. In this regard, two methods can be employed for effecting the shift of reactors in order that reactor 29 can be taken out of service and reactor 74 placed in service. One method involves a simultaneous adjustment of valves which causes parallel flow of reactant through all of the reactors in the system. By this method, assuming the reactant mixture to be passing through lines 20, 46 and 68, the parallel flow of reactant is effected by opening valves 27, 49 and 71 as well as valves 56, 88 and 91 in lines 59, 87 and 90, respectively. Consequently, the reactant mixture passes through lines 20, 21, 46, 47, 68 and 69. In order to take reactor 29 out of service, valves 26 and 36 in lines 20 and 35, respectively, are closed and the corresponding outlet valve 58 in line 57 is closed. Consequently, the reaction series comprises reactors 30, 52 and 74 and the flow of reactant is by means of line 21 to reactor inlet 24 of reactor 30 with the product being discharged through bottom line 55 and lines 59 and 35. The reactant is reheated and thence it flows through lines 45, 47 and 51 which lead to reactor 52 and the product is discharged through lines 80 and 87 before entering line 57 which leads to furnace 63. The final stage of the reaction is effected by passing the reactant through lines 66, 69 and 73, and after the reaction, the product is discharged through lines 90 and 85 for further processing in the product recovery system.

Another example of a method by which the reactors can be shifted in order to avoid interruption of the reactant flow is the case involving reactors 30, 52 and 74 as the reaction series and reactor 29 being held as the reserve. If it is necessary to regenerate reactor 74, this can be readily accomplished by the stepwise procedure which, in the case of the present invention, is preferred. Accordingly, valve 26 in line 20 is opened as well as valve 36 in line 35, thus placing reactor 29 and 30 in parallel flow arrangement. Thereafter, valve 27 in line 21 and valve 56 in line 59 are closed. Hence, the reactant material passes through reactors 29, 52 and 74. The next step in the operation involves placing reactors 30 and 52 in parallel flow arrangement. To accomplish this purpose, valve 48 in line 46 and valve 58 in line 57 are opened. Hence, oil reactant passes through reactors 30 and 52 in parallel manner. Reactor 52 is discontinued from service by closing valve 49 in line 47, as well as valve 88 in line 87. In the final stage of the shift operation, valve 70 in line 68 and valve 83 in line 82 are opened, thus permitting parallel flow of reactant through reactors 52 and 74. Finally, valve 71 in line 69 and valve 91 in line 90 are closed, thus the reaction series comprises reactors 29, 30 and 52.

The manner by which the reactors are shifted in order to take one of them out of service and replace it by the reactor in reserve is applicable to any system in which it is desired to pass the vaporous or chemical material through a series of at least two reactors or contactors. Therefore, it should be understood that the present invention is not limited by reason of the specific illustrations given, but that the scope thereof is defined by the appended claims.

I claim:

1. A system comprising at least three reaction means, each reaction means contains an inlet and outlet means, an inlet header means interconnecting the inlet means of all said reaction means, fluid supply means connected to said header means and constituting in number one less than the total number of reaction means, the fluid supply means providing fluid flow to adjacent reaction means, valve means situated such that a valve means is present between the fluid supply means and the reaction inlet means, an outlet header means interconnected with said reaction outlet means, product outlet means connected to said outlet header means and constituting in number one less than the total number of reaction means, situated such that a valve means is present between a product outlet means and a reaction outlet means.

2. A system comprising four vertical, cylindrical reactors, each reactor containing an inlet and outlet conduit, an inlet header conduit interconnecting the inlet conduits of all of the reactors, three fluid supply conduits connected to the inlet header conduit and adapted to provide parallel flow to adjacent reactors, valve means associated with the inlet header conduit such that a valve means is present between a fluid supply conduit and a reactor inlet conduit, an outlet header conduit interconnected with all of said reactor outlet conduits, three product outlet conduits connected to said outlet header conduit and providing a single outlet for pairs of reactors having a parallel flow arrangement, and valve means situated such that a valve means is present between a product outlet conduit and a reactor outlet conduit.

3. In a catalytic hydrocarbon conversion process utilizing a plurality of catalytic reaction zones in which it becomes necessary to periodically regenerate the catalyst for the removal of carbonaceous material deposited thereon during the conversion process, the method of operating which comprises introducing a hydrocarbon reactant to a system which comprises at least two contacting zones containing said catalyst adapted for serial flow therethrough, an additional contacting zone containing said catalyst for service in the reaction series when one of said zones is being regenerated, all of the contacting zones being situated to provide parallel flow of the hydrocarbon reactant to pairs thereof, there being at least two such pairs and at least one of the zones forms two pairs with two other zones to provide two separate parallel flow arrangements, passing the hydrocarbon reactant through the contacting zones adapted for serial flow under reaction conditions suitable for conversion of the hydrocarbon until such time as regeneration of the catalyst in one of said zones is required, placing at least the zone not in reaction service in parallel flow arrangement with a zone forming a pair therewith and discontinuing parallel flow of reactant through the zones by having the zones shift in position relative to the original reaction series such that the zone originally not in service is part of the serial flow in the reaction series and the zone to be regenerated is out of service.

4. In a catalytic hydrocarbon conversion process utilizing a plurality of catalytic reaction zones in which it becomes necessary to periodically regenerate the catalyst for the removal of carbonaceous material deposited thereon during the conversion process, the method of operating which comprises introducing a hydrocarbon reactant to a system which comprises at least two contacting zones containing said catalyst adapted for serial flow therethrough, an additional contacting zone containing said catalyst for service in the reaction series when one of said zones is being regenerated, all of the contacting zones being situated to provide parallel flow of hydrocarbon reactant to pairs thereof, there being at least two such pairs and at least one of the zones forms two pairs with two other zones to provide two separate parallel flow arrangements, passing the hydrocarbon reactant through the contacting zones adapted for serial flow under reaction conditions suitable for conversion of the hydrocarbon until such time as regeneration of the catalyst in one of said zones is required, placing the zone not in reaction service in parallel flow arrangement with a zone having reactant flow therethrough and forming a pair therewith, discontinuing the flow of reactant through the zone originally not in service such that the latter zone is placed in reaction service, and the shifting of zones in reaction service with the zone being taken out of service is repeated until the zone to be regenerated is out of service.

5. In a catalytic hydrocarbon conversion process utilizing a plurality of catalytic reaction zones in which it becomes necessary to periodically regenerate the catalyst for the removal of carbonaceous material deposited thereon during the conversion process, the method of operating which comprises introducing a hydrocarbon reactant to a system which comprises at least two contacting zones containing said catalyst adapted for serial flow therethrough, an additional contacting zone containing said catalyst for service in the reaction series when one of said zones is being regenerated, all of the contacting zones being situated to provide parallel flow of hydrocarbon reactant to pairs thereof, there being at least two such pairs and at least one of the zones forms two pairs with two other zones to provide two separate parallel flow arrangements, passing the hydrocarbon reactant through the contacting zones adapted for serial flow under reaction conditions suitable for conversion of the hydrocarbon until such time as regeneration of the catalyst in one of said zones is required, placing any zones situated between the zone to be regenerated and the zone not in reaction service including the two latter zones in parallel flow arrangement with the zones capable of forming pairs therewith and discontinuing parallel flow in said zones by including the zone originally not in service in the reaction series and taking out of service the zone to be regenerated.

6. In a process in which a gasiform chemical material is passed through a plurality of solids containing contacting zones and in which it becomes necessary to periodically subject the solids to a combustion treatment for the removal of contaminating material deposited thereon during the process, the method of operating which comprises introducing a gasiform chemical material to a system which comprises at least two contacting zones containing said solids adapted for serial flow therethrough, an additional contacting zone containing said solids for service in the series when one of said zones is being subjected to a combustion treatment, all of the contacting zones being situated to provide parallel flow of said chemical material to pairs thereof, there being at least two such pairs and at least one of the zones forms two pairs with two other zones to provide two separate parallel flow arrangements, passing the gasiform chemical material through the contacting zones adapted for serial flow until such time as combustion treatment of the solids in one of said zones is required, placing at least the zone not in reaction service in parallel flow arrangement with a zone forming a pair therewith and discontinuing parallel flow of chemical material through the zones by having the zones shift in position relative to the original series such that the zone originally not in service is part of the serial flow in the series and the zone to be subjected to the combustion treatment is out of service.

7. The process of claim 6 wherein the process is operated by the method comprising the placement of the zone not in service in parallel flow arrangement with a zone having chemical material flowing therethrough and thereby forming a pair therewith, discontinuing the flow of chemical material through the zone in parallel flow arrangement with the zone originally not in service such that the latter zone is placed in service, and the shifting of zones in service with the zone taken out of service is repeated until the zones to be subjected to the combustion treatment is out of service.

8. The process of claim 6 wherein it is operated by the method comprising the placement of any zones situated between the zone to be subjected to a combustion treatment and the zone not in service including the two latter zones in parallel flow arrangement with the zones capable of forming pairs therewith, and discontinuing parallel flow in said zones by placing the zone originally not in service in the series and taking out of service the zone to be subjected to a combustion treatment.

9. The process of claim 3 wherein the hydrocarbon reactant is a light hydrocarbon oil, the catalyst is a platinum catalyst and the reaction conditions are suitable to effect reforming of the light hydrocarbon oil.

10. The process of claim 4 wherein the hydrocarbon reactant is a light hydrocarbon oil, the catalyst is a platinum catalyst and the reaction conditions are suitable to effect reforming of the light hydrocarbon oil.

11. The process of claim 5 wherein the hydrocarbon reactant is a light hydrocarbon oil, the catalyst is a platinum catalyst and the reaction conditions are suitable to effect reforming of the light hydrocarbon oil.

12. In a catalytic hydrocarbon conversion process utilizing a plurality of catalytic reaction zones in which it becomes necessary to periodically regenerate the catalyst for the removal of carbonaceous material deposited thereon during the conversion process, the method of operating which comprises introducing a hydrocarbon reactant to a system which comprises at least three contacting zones containing said catalyst adapted for serial flow therethrough, an additional contacting zone containing said catalyst for service in the reaction series when one of said zones is being regenerated, all of the contacting zones being situated to provide parallel flow of hydrocarbon reactant to pairs thereof, there being at least two such pairs and at least one of the zones forms two pairs with two other zones to provide two separate parallel flow arrangements, passing the hydrocarbon reactant through the contacting zones adapted for serial flow under reaction conditions suitable for conversion of the hydrocarbon until such time as regeneration of the catalyst in one of said zones is required, placing the zone not in reaction service in parallel flow arrangement with a zone having reactant flow therethrough and forming a pair therewith, discontinuing the flow of reactant through the zone originally not in service such that the latter zone is placed in reaction service, and the shifting of zones in reaction service with the zone being taken out of service is repeated until the zone to be regenerated is out of service.

13. The process of claim 12 wherein the hydrocarbon reactant is a naphtha fraction, the catalyst is platinum, and the conversion conditions are maintained to provide for reforming of the naphtha.

14. A system comprising at least three vertical, cylindrical reactors, each reactor contains an inlet and outlet means, an outlet header conduit interconnecting the inlet means of each reactor, fluid supply means connected to said inlet header conduit and constituting in number one less than the total number of reactors, the fluid supply means providing fluid flow to adjacent reactors, valve means situated such that a valve means is present between the fluid supply means and the reactor inlet means, an outlet header conduit connected to said outlet means, product outlet means connected to the outlet header means and constituting in number one less than the total number of reactors, valve means situated such that a valve means is present between a product outlet means and a reactor outlet means and at least one of said product outlet means is connected to at least one of said fluid supply means.

References Cited in the file of this patent

UNITED STATES PATENTS

| | | |
|---|---|---|
| 2,357,365 | Van Horn et al. | Sept. 5, 1944 |
| 2,357,531 | Mather et al. | Sept. 5, 1944 |
| 2,479,110 | Haensel | Aug. 16, 1949 |
| 2,642,381 | Dickinson | June 16, 1953 |